(12) United States Patent
Lindon

(10) Patent No.: US 11,593,667 B2
(45) Date of Patent: *Feb. 28, 2023

(54) A/B TESTING USING SEQUENTIAL HYPOTHESIS

(71) Applicant: Optimizely, Inc., San Francisco, CA (US)

(72) Inventor: Michael Lindon, San Francisco, CA (US)

(73) Assignee: Optimizely, Inc., San Francisco, CA (US)

( * ) Notice: Subject to any disclaimer, the term of this patent is extended or adjusted under 35 U.S.C. 154(b) by 253 days.

This patent is subject to a terminal disclaimer.

(21) Appl. No.: 17/077,911

(22) Filed: Oct. 22, 2020

(65) Prior Publication Data

US 2022/0129765 A1  Apr. 28, 2022

(51) Int. Cl.

| | |
|---|---|
| G06F 11/36 | (2006.01) |
| G06N 5/02 | (2023.01) |
| G06F 40/143 | (2020.01) |
| G06N 7/00 | (2023.01) |
| G06F 11/30 | (2006.01) |

(52) U.S. Cl.
CPC .............. *G06N 5/02* (2013.01); *G06F 11/30* (2013.01); *G06F 11/3688* (2013.01); *G06F 40/143* (2020.01); *G06N 7/00* (2013.01)

(58) Field of Classification Search
CPC .. G06F 11/30; G06F 11/3006; G06F 11/3438; G06F 11/3688; G06F 2201/875
See application file for complete search history.

(56) References Cited

U.S. PATENT DOCUMENTS

| | | | |
|---|---|---|---|
| 6,889,053 B1* | 5/2005 | Chang | G01S 5/0278 342/357.29 |
| 7,555,551 B1 | 6/2009 | McCorkendale et al. | |
| 2006/0184918 A1 | 8/2006 | Rosaria et al. | |
| 2014/0337359 A1* | 11/2014 | Airoldi | G06F 16/24578 707/748 |
| 2016/0253311 A1* | 9/2016 | Xu | G06F 3/04842 715/256 |
| 2017/0083429 A1* | 3/2017 | Pekelis | G06F 11/3688 |
| 2017/0323329 A1* | 11/2017 | Katariya | G06N 7/005 |
| 2017/0323331 A1* | 11/2017 | Malek | G06Q 30/0246 |
| 2018/0082326 A1* | 3/2018 | Vlassis | G06Q 30/0242 |

(Continued)

OTHER PUBLICATIONS

P. Dmitriev, S. Gupta, K. Dong Woo, and G. Vaz, "A Dirty Dozen: Twelve Common Metric Interpretation Pitfalls in Online Controlled Experiments," Proc. 23rd ACM SIGKDD Int. Conf. Knowl. Discov. Data Min.—KDD '17, pp. 1427-1436, 2017.

(Continued)

*Primary Examiner* — Kamini B Patel
(74) *Attorney, Agent, or Firm* — Womble Bond Dickinson (US) LLP

(57) ABSTRACT

A method of executing an A/B test includes, during execution of the A/B test, determining, by a processing device using a sequential frequentist test, that a sample ratio mismatch has occurred, wherein the sample ratio mismatch is determined before the A/B test ends the execution. The method further includes, in response to the determining, ending the execution of the A/B test before a previously scheduled end of the A/B test.

18 Claims, 7 Drawing Sheets

(56) References Cited

U.S. PATENT DOCUMENTS

2018/0129760 A1* 5/2018 Kazerouni ......... G06Q 30/0241
2018/0341975 A1* 11/2018 Fellows .............. G06F 16/9577

OTHER PUBLICATIONS

Fabijan, A., et al. "Microsoft Experimentation Platform: Diagnosing Sample Ratio Mismatch in A/B Testing", Microsoft Research, Sep. 14, 2020, pp. 1-7.

Fabijan, A., et al. "Diagnosing Sample Ratio Mismatch in Online Controlled Experiments: A Taxonomy and Rules of Thumb for Practitioners", in Proceedings of ACM SIGKDD International Conference on Knowledge Discovery and Data Mining (KDD'19), Aug. 4-8, 2019, Anchorage, Alaska. ACM, New York, NY, USA, 9 pages.

Mattos, D. "Towards Automated Experiments in Software Intensive Systems", Chalmers University of Technology, Gothenburg, Sweden (2018), 126 pages.

Untitled Twitter post, 4 pages, posted Nov. 21, 2017 by user "ronnyk" (Ronny Kohavi) located on the Internet: at <https://twitter.com/ronnyk/status/932798952679776256?lang=en>.

Deng, A., et al., "Continuous monitoring of A/B tests without pain: Optional stopping in Bayesian testing", 2016 IEEE Int'l Conf. on Data Science and Advance Analytics [online], 2016 [retreived Feb. 24, 2022], retrieved from Internet: <URL: https://ieeexploreieee.org/stamp/stamp.jsp?amumber=7769610>, pp. 243-252.

Jackson, J.E., Multivariate Sequential Procedures for Testing Means, Virginia Tech [online], 1959 [retreived Oct. 28, 2021], Retrieved from Internet: <URL:https://vtechworks.lib.vt.edu/blstream/handle/10919/88658/LD5655.V856_1959.J2324.pdf?sequence=1>, whole document.

Lindon. M, A Better Way to Test for Sample Ratio Mismatchees (SRMs) and Validate Experiment Implementations, Medium, Nov. 2020 [retreived Oct. 28, 2021], Retrieved from Internet: URL:https://medium.com/engineers-optimizely/a-better-way-to-test-for-sample-ratio-mismatches-srms-and-validate-experiment-implementations-6da7c0d64552>, pp. 1-9.

International Search Report and Written Opinion on the Patentability of Application No. PCT/US2021/054551 dated Feb. 1, 2022, 14 pages.

Ron Kohavi et al: "Practical Guide to Controlled Experiments on the Web," Proceedings of the 13th ACM SIGKDD International Conference on Knowledge Discovery and Data Mining, KDD '07, ACM Press, Aug. 12, 2007.

* cited by examiner

400

```
┌─────────────────────────────────────────────┐
│ CONFIGURE AN A/B TEST TO COMPRISE A FIRST   │
│ PLURALITY OF USERS IN A CONTROL GROUP AND   │
│ A SECOND PLURALITY OF USERS IN A TEST       │
│ GROUP, WHEREIN THE FIRST PLURALITY OF       │
│ USERS AND THE SECOND PLURALITY OF USERS     │
│ ARE TO BE PROVIDED TWO DIFFERENT VERSIONS   │
│ OF A WEBPAGE                                │
│                    402                       │
└─────────────────────────────────────────────┘
                      │
                      ▼
┌─────────────────────────────────────────────┐
│ WHILE THE A/B TEST IS EXECUTING, DETERMINE, │
│ BY A PROCESSING DEVICE, THAT A SAMPLE RATIO │
│ MISMATCH CORRESPONDING TO THE SECOND        │
│ PLURALITY OF USERS HAS OCCURRED, WHEREIN    │
│ THE SAMPLE RATIO MISMATCH IS DETERMINED     │
│ BEFORE THE A/B TEST ENDS EXECUTING          │
│                    404                       │
└─────────────────────────────────────────────┘
                      │
                      ▼
┌─────────────────────────────────────────────┐
│ IN RESPONSE TO THE DETERMINING, END THE     │
│ EXECUTING OF THE A/B TEST BEFORE A          │
│ PREVIOUSLY SCHEDULED END OF THE A/B TEST    │
│                    406                       │
└─────────────────────────────────────────────┘
```

FIG. 4

A/B TESTING USING SEQUENTIAL HYPOTHESIS

FIELD OF TECHNOLOGY

The embodiments described herein pertain in general to an A/B testing service and more particularly to a customizable-decision A/B testing service.

BACKGROUND

Content variation testing is a type of experiment that tests changes to content against a current version of the content. One example of content variation testing is web page variation testing where an experiment is conducted that tests a web page (or one or more elements on the page) against another design of the web page (or one or more variations of the elements on the page). During variation testing of a web page, user interaction with a web page or its variations is measured (for example, whether a user clicks on a button or a variation of a button), and the effects of the modifications to a web page (or its elements) that produce positive or negative results are determined. The positive results associated with a particular modification to a web page validates that the modification to the web page should be used in a production version of the web page. A variety of internal and external platforms may be used in conjunction for variation testing of a web page.

BRIEF DESCRIPTION OF THE DRAWINGS

FIG. 4 is a first flow diagram of a method of an A/B testing sample ratio mismatch solver, according to one embodiment.

Figure 1:
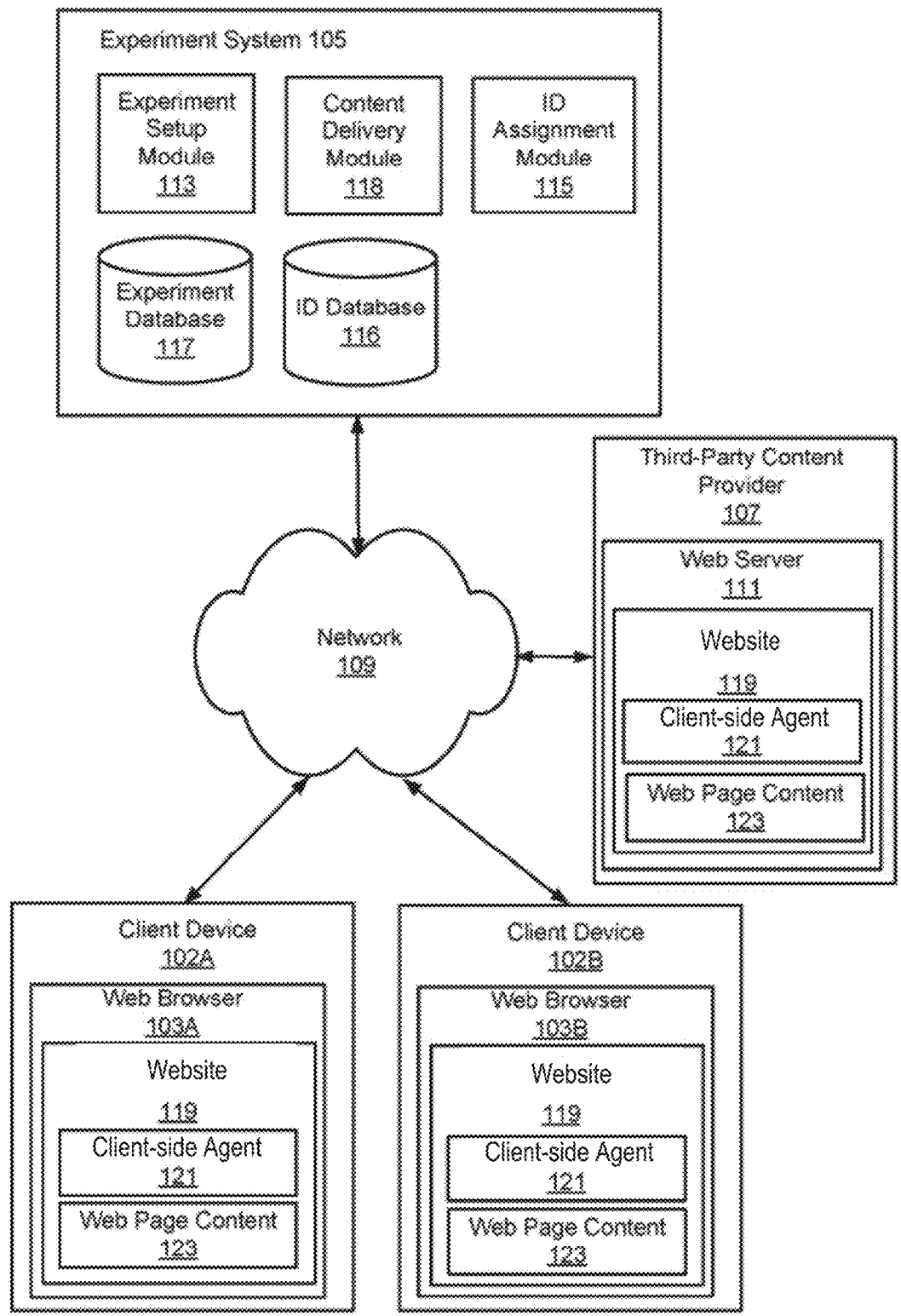
FIG. 1 is a block diagram of an experiment system environment, according to one embodiment.

The FIGs. depict an embodiment for purposes of illustration only. One skilled in the art will readily recognize from the following description that alternative embodiments of the structures and methods illustrated herein may be employed without departing from the principles described herein.

DETAILED DESCRIPTION

Content providers may run content experiments such as A/B tests (e.g., variation testing) to answer specific questions regarding which variation of a content item such as a web page or digital product (including various features) is more successful. Many content experiments include visitor criteria that determines whether a visitor is eligible for the experiment and if so, which variations of the content experiment should be shown to the visitor. The systems that implement these content experiments may be implemented in the backend of the content provider's system or as a separate node that communicates with the back end of the content provider's system. Simultaneously, content providers may bring up content delivery networks (CDNs) in the front-end of their systems to provide for content caching, including caching of content experiment variations.

Simply randomized designs are one type of controlled experiments used to study causal effects. In one embodiment, failure of the assignment mechanism, to provide proper randomization of units across treatments, or the data collection mechanism, when data is "missing not at random", can render subsequent analysis invalid if not properly identified. In one embodiment, such practical implementation errors may be identified through consideration of the total unit counts resulting in each treatment group. Based on this observation, a sequential hypothesis test may be constructed from Bayesian multinomial-Dirichlet families for detecting practical implementation errors in simply randomized experiments, as described herein. By establishing a Martingale property of the posterior odds under the null hypothesis, frequentist Type-I error is controlled under both optional stopping and continuation via maximal inequalities, preventing practitioners from potentially inflating false positive probabilities through continuous monitoring.

In contrast to other statistical tests, which may be performed once all data collection is completed, the disclosed test is sequential—frequently rejecting the null during the process of data collection itself, saving further units from entering an improperly-executed experiment. The utility of this test is demonstrated in the context of online controlled experiments (OCEs), where assignment is automated through code and data collected through complex processing pipelines, often in the presence of unintended bugs and logical errors. Confidence sequences possessing nominal sequential frequentist coverage probabilities are also provided and their connection to the Bayesian support interval is examined. The differences between the pure Bayesian and sequential frequentist testing procedures are finally discussed through a conditional frequentist testing perspective.

Randomized treatment assignment may satisfy many purposes in controlled experiments. Arguably the least controversial justification is the attempt to remove any personal, systematic, or selection bias in the treatment assignment mechanism, although this is neither without criticism nor without alternative. Consider, for example, a medical researcher who administers a preferred experimental drug to only the patients most likely to recover. Without explicitly conditioning on this information in the assignment mechanism, causal estimands, such as the average treatment effect, may be biased and overestimate the efficacy of the new drug. Simply randomized experiments attempt to remove the possibility of bias by randomly assigning experimental units independently to treatment groups. This design may be useful in contexts where units enter the experiment sequentially, as opposed to all being simultaneously available like in completely randomized designs, and are often used in the technology industry to run online controlled experiments. Formally, let there be d treatment groups, $\theta_0 \in \Delta^d$ be a probability vector where element $\theta_{0,i}$ denotes the probability of any unit being assigned to treatment group i, and $x_j$ a random variable denoting the assignment outcome of the jth experimental unit. The simply randomized design can then be summarized by the following probabilistic assignment mechanism $$x_1, x_2, \ldots \sim \text{Multinomial}(1, \theta_0). \tag{1}$$

In one embodiment, the statistician may not be personally involved with the data collection process and may simply be told the assignment mechanism after being presented with the data for analysis. The observant statistician has a right for concern, therefore, when they are provided with data which does not support the purported assignment mechanism. For simply randomized experiments, the total unit counts assigned to each treatment group can provide evidence that the model (1) is not true. Indeed, this is a strong indicator that the experiment has not been conducted as expected; for example, the assignment mechanism could be biased, there could be systematic data loss, or generally when the data can be considered "missing not at random" (MNAR). Such observations may occur frequently in OCEs and are colloquially referred to in the technology industry as sample ratio mismatches (SRMs).

OCEs automate the assignment mechanism, data collection and data cleaning through code, which often introduces bugs and logical errors. The engineering architecture required for assignment and data collection in OCEs and how SRMs frequently reveal bugs therein are both described herein. A simple example of an experiment to study user engagement on an improved version of a web page is also provided. Not all visitors to a web page are human, however, and data must, in some circumstances, be cleaned to remove non-human interactions with the page, such as from web crawlers and scrapers. Unfortunately, the classification between human and non-human visitors is performed algorithmically, and some users in the treatment group may be so engaged with the new page that they were accidentally classified as non-human and removed prior to the analysis—essentially removing units most in favor of the treatment, resulting in fewer units than expected being reported in the treatment group. This may not be an issue with the assignment mechanism, but in the data collection. It is an example of a censoring missing data mechanism, a special case of MNAR.

An example is contemplated, in which the user identifier becomes lost, preventing users from receiving a consistent experience over time, with some users initially assigned to the treatment becoming exposed to and recorded in the control—an example of noncompliance. Many other practical abnormalities can be revealed by considering the total counts in each treatment group after collection. For this reason, industry practitioners now consider performing a post-experiment Chi-squared test against the null in equation (1) best practice; such a test may identify a SRM. However, there exist at least two deficiencies of this practice.

First, one only learns about a problem in the data after data collection has completed. It is assumed that there is an implicit cost of including a unit in an experiment, and so ideally one would like to learn about such problems as soon as possible to prevent further units from entering an improperly executed-experiment. Second, the desire to find SRMs early encourages practitioners to incorrectly continuously monitor their experiments through the repeated application of significance tests without any multiplicity correction.

In the present disclosure, a sequential test is proposed to identify SRMs that allows for optional stopping and optional continuation. The methods and systems described herein are inspired by Bayesian methods satisfying the stopping rule principle, which requires that that statistical conclusions provided by a hypothesis test should be independent of the reason for stopping the experiment, which follows from the likelihood principle. The contributions of this disclosure focus, however, on obtaining frequentist properties of such a sequential test.

First, the disclosure defines a common Bayesian test through conjugate multinomial-Dirichlet models. Second, the disclosure establishes the Martingale properties of the posterior odds un-der the null hypothesis, enabling a modified test to be developed which allows control of the frequentist Type-I error probabilities under both optional stopping and continuation. This safely permits the online testing of hypothesis (1) after every single observation, without inflating frequentist Type-I error, with the obvious advantage of being able to safely reject the null and discover a practical implementation error early in the beginning of an experiment—preventing experimental units being wasted on a faulty experiment. Instance-specific upper-bounds on time-to-rejection are provided in terms of the KL divergence between $\theta_0$ and the actual generating distribution of the samples. This sequential test is then inverted to define confidence sequences which possess nominal frequentist coverage probabilities. A number of simulation studies are presented, illustrating how false positive probabilities are dramatically inflated through the repeated significance testing using a Chi-squared test compared to the guarantees afforded by the proposed test. The number of samples needed to reject the null when the null is invalid is also contemplated. The differences between the pure Bayesian test and the proposed test are also contemplated from the perspective of conditional frequentist testing.

FIG. 1 is a block diagram of a variant testing system environment 100 according to one embodiment. Environment 100 includes client devices 102 (e.g., client device 102A and client device 102B). In one embodiment, client device 102A is a device of a first user and client device 102B is a device of a second user. Client device 102A may represent one or more devices of the first user and client device 102B may represent one or more devices of the second user. Client devices 102 are connected to an experiment system 105 and a third-party content provider 107 via a network 109. In one embodiment, experiment system includes one or more experimentation platforms to configure experiments and/or program management platforms to manage the experiment system. Although the environment 100 shown in FIG. 1 only includes two client devices 102, the environment 100 can include any number of client devices (e.g., thousands of client devices 102).

FIG. 1 and the other figures use like reference numerals to identify like elements. A letter after a reference numeral, such as "102A," indicates that the text refers specifically to the element having that particular reference numeral. A reference numeral in the text without a following letter, such as "102," refers to any or all of the elements in the figures bearing that reference numeral.

The network 109 enables communication among the entities connected to it. In one embodiment, network 109 is the Internet and uses standard communications technologies and/or protocols. Thus, network 109 can include links using technologies such as Ethernet, Wi-Fi (e.g., 802.11), worldwide interoperability for microwave access (WiMAX), 3G, Long Term Evolution (LTE), digital subscriber line (DSL), asynchronous transfer mode (ATM), InfiniBand, etc. Similarly, the networking protocols used on network 109 can include multiprotocol label switching (NIPLS), the transmission control protocol/Internet protocol (TCP/IP), the User Datagram Protocol (UDP), the hypertext transport protocol (HTTP), the simple mail transfer protocol (SMTP), the file transfer protocol (FTP), etc. The data exchanged over the network 109 can be represented using technologies and/or formats including the hypertext markup language (HTML), the extensible markup language (XML), etc. In addition, all or some of links can be encrypted using conventional encryption technologies such as the secure sockets layer (SSL), transport layer security (TLS), virtual private networks (VPNs), Internet Protocol security (IPsec), etc. In one embodiment, network 109 may include but is not limited to any combination of a local area network (LAN), a metropolitan area network (MAN), and a wide area network (WAN). In another embodiment, the entities use custom and/or dedicated data communications technologies instead of, or in addition to, the ones described above.

Client devices 102 communicate with the third-party content provider 107 via the network 109 to receive content items such as web pages from the third-party content provider 107. In one embodiment, each client device 102 is a computer system capable of communicating with the experiment system 105 and the third-party content provider 107. Examples of client devices 102 include a personal computer, a mobile phone, a tablet, a personal digital assistant (PDA), or a laptop. As shown in FIG. 1, each client device 102 includes a web browser 103 (e.g., web browser 103A and web browser 103B). The web browser 103 is a computer program stored on a client device 102 that allows the user of client 102 to access web pages on the World Wide Web such as websites 119 provided by the third-party content provider 107. Suitable web browsers include, but are not limited to, GOOGLE CHROME®, MICROSOFT INTERNET EXPLORER®, MICROSOFT EDGE®, MOZILLA FIREFOX®, and APPLE SAFARI®. In addition to web browsers, a client device may process a web page in an environment like NODE.JS, in which an experiment system and other third-party content providers may execute JAVASCRIPT™ code in an interpreter with support for microtask and macrotask queues.

As mentioned above, the environment 100 includes a third-party content provider 107. Hereinafter, the third-party content provider 107 is referred to as a "content provider 107" for ease of description. The content provider 107 may be an individual, a group of individuals, or an entity such as a company. In one embodiment, the content provider 107 provides content items to client devices 102. While only one content provider 107 is shown, it is understood that any number of content providers are supported and can be in the environment 100 at any time.

In one embodiment, the content items provided by the content provider 107 are included as part of a website 119 (e.g., a dynamic website or application). For example, the content provider 107 may provide content items such as navigation bars, backgrounds, call to action buttons, links, CSS styles, pop-ups, video, audio, a combination of video and audio, still images (e.g., JPEG), text documents, advertisements, and/or any other types of content. For purposes of convenience and the description of one embodiment, the content items provided by the content provider 107 will be referred to as a single-page web pages, but no limitation on the type of content items are intended by this terminology. In one embodiment, a single-page web page refers to a view of a website 119. For example, a single-page web page may be the initial view of a website 119 when the user first loads the website 119 or the view when the user navigates over a navigation bar element and a menu is displayed in response to the navigation over the navigation bar. In other embodiments, a single-page web page may refer to any other type of dynamic website or dynamic application.

In one embodiment, the content provider 107 operates in conjunction with the experiment system 105 to perform variation testing on a website 119 containing one or more single-page web pages. In one embodiment, the content provider 107 sends a single-page web page to client devices 102 together with a client-side experimentation agent 121, which includes or subsequently downloads from the experiment system 105 conditions and instructions for modifying the single-page web page. A variation test for a single-page web page of a website 119 tests changes to the single-page web page against the current variation of the single-page web page (e.g., the original version of the single-page web page) to determine how the variation alters user interaction with the web page or whether the changes produce a desired result. An example of a desired result resulting from a change to a single-page web page is an increased interaction with the web page such as an increased selection of an advertisement(s) included in the single-page web page or increased purchases of a product advertised on a single-page web page. Thus, variation testing validates a new design of a single-page web page or changes on elements on the single-page web page before the new design or changes are put into production by the content provider 107.

For a given single-page web page, the content provider 107 may have an associated smart page that includes one or more variations of the single-page web page that are used in a variation test for the single-page web page. In one embodiment, a variation test of a single-page web page involves an experiment that tests control "A" and a variation "B" on users requesting the single-page web page from the content provider 107. For ease of discussion, the embodiments discussed herein describe a web page having only two variations: the control and the variant. However, in other embodiments, a single page web page can have any number of variations.

Figure 2B:
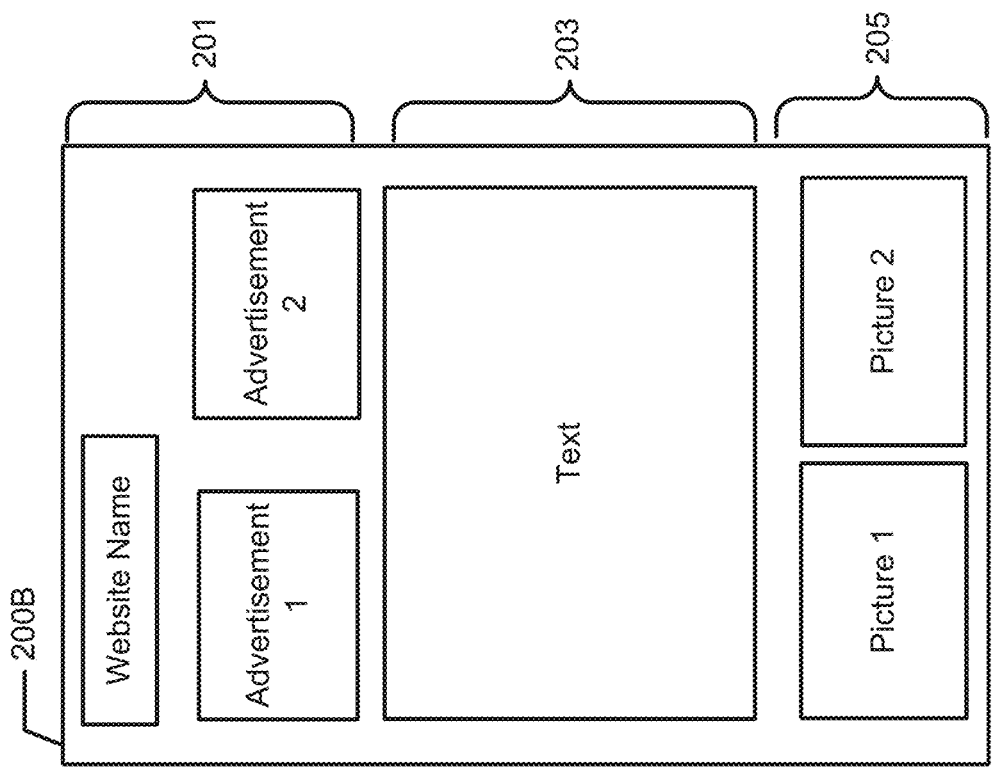
FIGS. 2A and 2B are example variations of a web page, according to one embodiment.
Figure 2A:
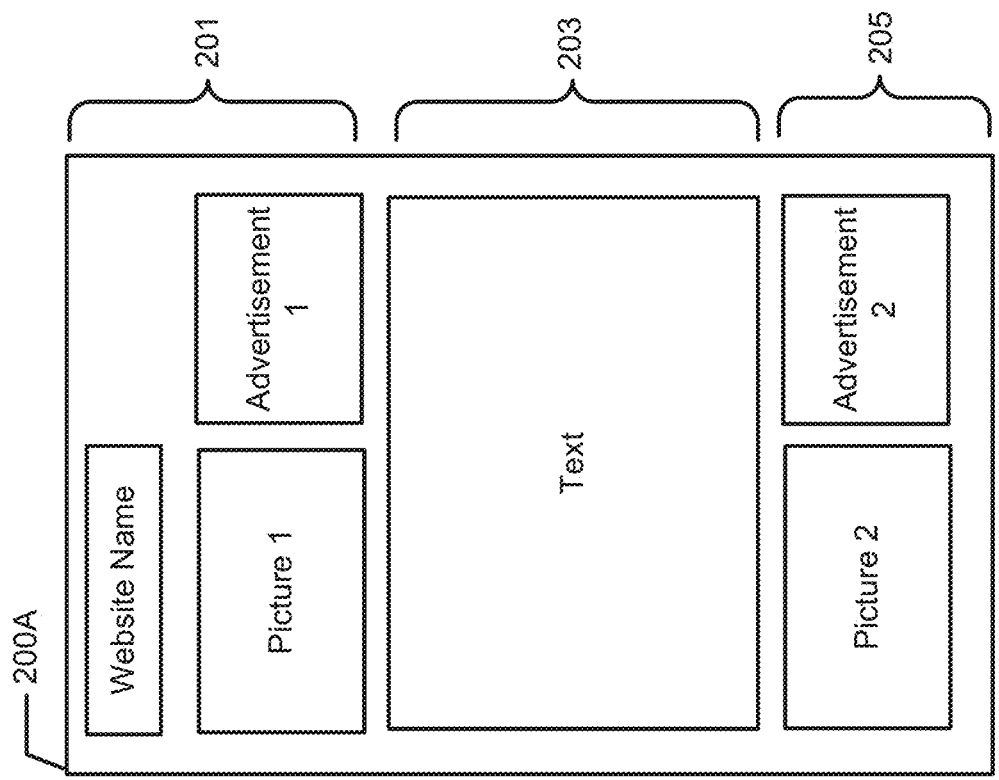

FIG. 2A is example "A" (e.g., the control) of a single-page web page 200A that represents the current implementation of the single-page web page provided by content provider 107. The control of the single-page web page 200A includes a website name of the website associated with the single-page web page, a first picture, and a first advertisement. The website name, the first picture, and the first advertisement are located in an upper portion 201 of the control of single-page web page 200A according to one embodiment. The control of single-page web page 200A also includes textual content located in a central portion 203 of the control of single-page web page 200A and the control of the single-page web page 200A also includes a second picture and a second advertisement located at a lower portion 205 of the control of the single-page web page 200A.

FIG. 2B is example "B" (e.g., the variant version) of a single-page web page 200B. The variant of the single-page web page represented by web page 200B includes a change (i.e., a modification) to the control of the single-page web page 200A shown in FIG. 2A. The variant of single-page web page 200B includes the website name, a first advertisement, a second advertisement, textual content, a first picture, and a second picture similar to the control of the single-page web page 200A shown in FIG. 2A. However, the variant of single-page web page 200B includes the second advertisement positioned in the upper portion 201 of single-page web page 200B whereas the second advertisement is positioned in the lower portion 205 in the control of the single-page web page 200A. In one embodiment, the variation test using the control and the variant of the single-page web page is conducted to determine whether the second advertisement receives more selections when the second advertisement is located at the lower portion 205 of the single-page web page as shown in FIG. 2A or when the second advertisement is located at the upper portion 201 of the single-page web page as shown in FIG. 2B. Noteworthy, any content of 201, 203, and 205 may be dynamic content that changes in according with a variety of conditions, as discussed herein.

Referring back to FIG. 1, in one embodiment the content provider 107 includes a web server 111. In one embodiment, the web server 109 links the content provider 107 to one or more client devices 102 and the experiment system 105 via the network 109. The web server 111 serves websites 119, as well as other web related content 123 for the website 119, such as JAVA™, FLASH™, XML, and so forth. The web server 111 may include a mail server or other messaging functionality for receiving and routing messages between the experiment system 105 and one or more client devices 102. In one embodiment, a website 119 provided by the web server 109 may include a client-side experimentation agent 121. The client-side experimentation agent 121 may be added to the website 119 by the third-party content provider 107 in one embodiment. The client-side experimentation agent 121 comprises code that loads experiment variation instructions from the experiment system 105.

As shown in FIG. 1, the variant testing system environment 100 also includes an experiment system 105. In one embodiment, the experiment system 105 establishes and conducts variation experiments for web pages included in websites 119 served by third party providers 107. In one embodiment, the experiment system 105 includes an experiment setup module 113, an ID assignment module 115, an ID database 116, an experiment database 117, and a content delivery module 118, according to one embodiment. As is known in the art, the term "module" refers to computer program logic utilized to provide the specified functionality. Thus, a module can be implemented in hardware, firmware, and/or software. In one embodiment, program modules are stored on a non-transitory storage device (i.e., a computer program product), loaded into a memory, and executed by one or more computer processors. Additionally, those of skill in the art will recognize that other embodiments of the experiment system 105 shown in FIG. 1 can have different and/or other modules than the ones described here, and that the functionalities can be distributed among the modules in a different manner.

In one embodiment, the experiment setup module 113 establishes experiments for websites 119 provided by the third-party content provider 107. The experiment setup module 113 receives input from an affiliate (e.g., an employee) of the third-party content provider 107 to establish a variation experiment for a single-page web page of a website 119 provided by the third-party content provider 107. In one embodiment, establishing a variation experiment for a single-page web page of a website 119 includes configuring a smart page for the single-page web page. In one embodiment, a smart page for a single-page web page is a set of instructions that describe when to activate a variation experiment associated with the single-page web page. The smart page may include one or more triggers and one or more conditions configured by the affiliate of the third-party content provider 107 that impact when variations of the associated single-page web page are selected and presented to a client device 102.

A smart page for a single-page web page may define one or more conditions. In one embodiment, a condition(s) for a smart page is a set of rules related to the state of the single-page web page that must be satisfied before the smart page for the single-page web page will activate. That is, a condition of a smart page describes the state of the world of the single-page web page that can be evaluated as true (i.e., valid) or false (i.e., invalid). Responsive to a condition being true, a smart page causes the performance of a specified action. For example, information included in the smart page specifies when and how to present experimental variants of the website 119 to viewing users if a condition in the smart-page is true. If a condition is false, the smart page may be deactivated if the smart page is currently active or the smart page may not be activated if not currently activated.

In one embodiment, a smart page for the single-page web page may also include at least one trigger. In one embodiment, a trigger defines when to evaluate the condition(s) for the smart page. That is, a trigger of a smart page is tied to an event on the single-page web page and signals a client device 102 to evaluate conditions associated with the trigger. Smart pages may include one or more triggers that can be of different trigger types. When a trigger event occurs, the smart page evaluates the corresponding conditions associated with the trigger event.

Figure 3A:
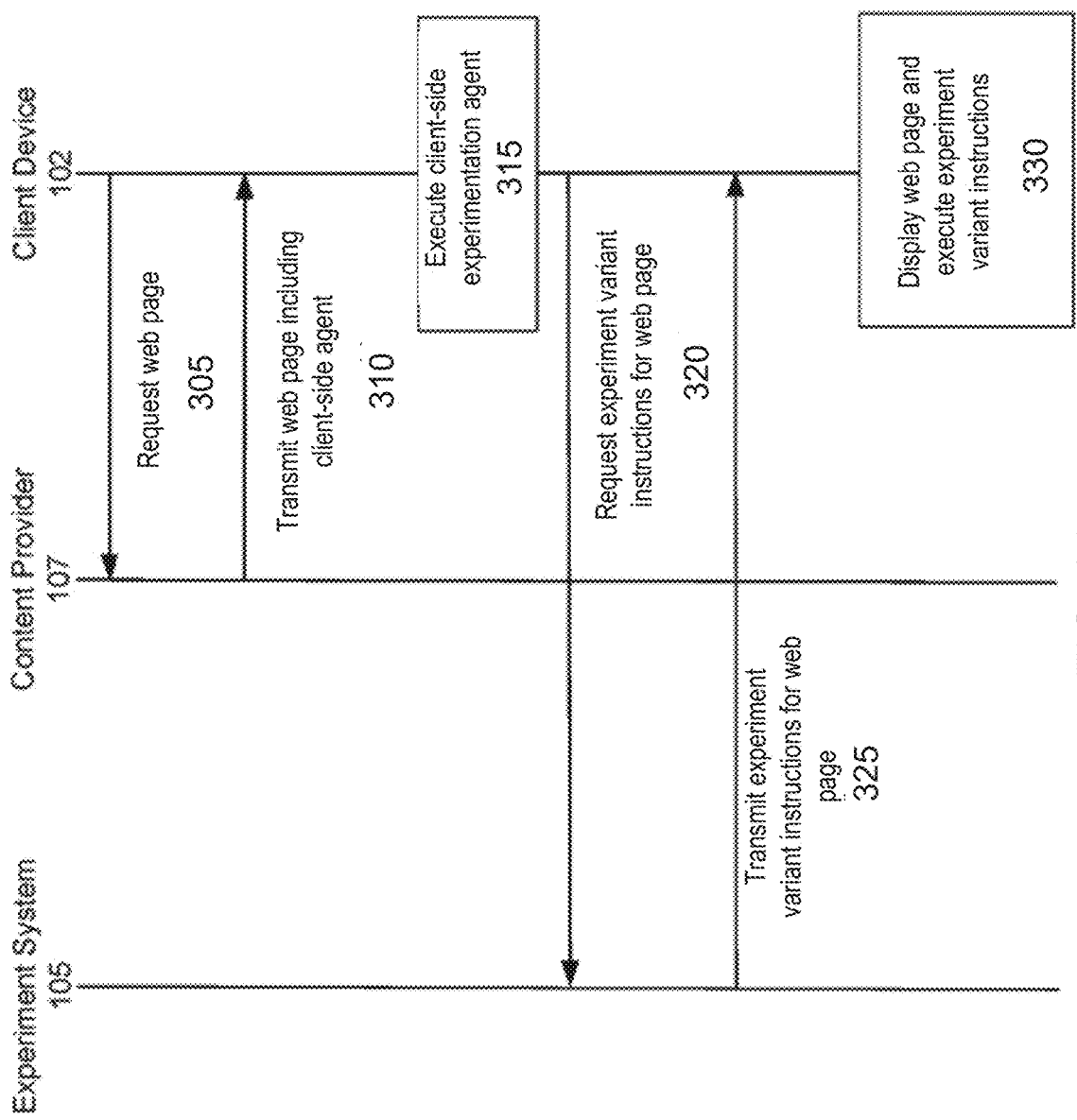
FIGS. 3A-3B are transaction diagrams illustrating interactions between an experiment system, a content provider, and a client device, according to one embodiment.
Figure 3B:
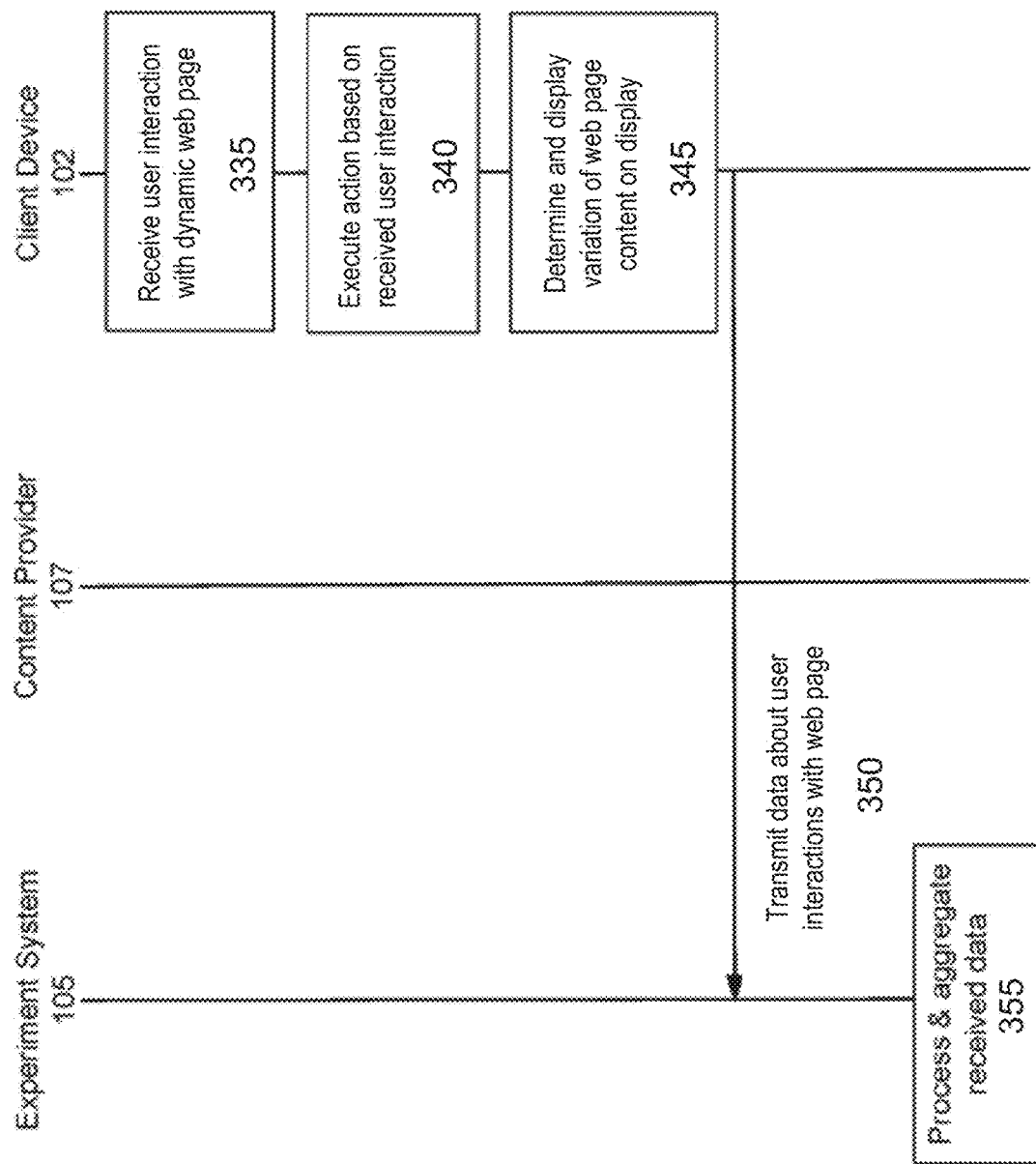

FIGS. 3A-3B are transaction diagrams illustrating interactions between an experiment system 105, a content provider 107, and a client device 102. In one embodiment, the experiment system 105 may be on the client device 102. In another embodiment, the experiment system 105 is separate from the client device 102, as shown. A client device 102 requests 305 a website 119 from a content provider 107. The content provider 107 transmits 310 the website 119 to the client device 102. The transmitted website 119 includes a client-side experimentation agent 121. The client-side experimentation agent 121 includes instructions that cause the client device 102 to retrieve from the experiment system 105 additional configurations or variations to perform alterations on the web page or its content (e.g., web page elements), including, in one embodiment, the triggers and conditions for one or more smart pages. The client device 102 executes 315 the client-side experimentation agent 121 which causes the client device 102 to request 320 instructions for executing experiment variants for a single-page web page of the website 119 from the experiment system 105. The experiment system 105 transmits 325 the experiment variant instructions for the single-page web page of the website 119 to the client device 102. The instructions include the triggers and conditions for the smart pages and where they are stored in the client-side experimentation agent 121 within the web browser 103. The client device 102 displays 330 the single-page web page to a user of the client device 102 and executes the web browser 103 and the client-side experimentation agent containing the experiment variant instructions.

The client-side experimentation agent 121 contains instructions to allow it to interact with the web browser 103, including instructions to interact with the web browser's APIs. For example, the client-side experimentation agent 121 contains instructions to interact with the MutationObserver API. The MutationObserver API provides the ability to watch for changes being made to the DOM tree by identifying a target element. The target element may be a single node in the DOM tree or a subtree including multiple nodes. When a change occurs to the identified target element, such as adding, modifying, and removing nodes or node attributes and modifying text data, additional code can be configured using the MutationObserver API to watch for changes and transmit them to the client-side experimentation agent 121. In another example, the client-side experimentation agent 121 interacts with a site visitor's web browser session history. In one example, the client-side experimentation agent 121 detects when a URL changes even if the full page does not reload in order to execute experiments.

Referring to FIG. 3B, the client device 102 receives 335 a user's interactions with the website 119 that has been loaded onto the browser running on the client device 102. For example, the client device 102 identifies a user interaction of clicking or selecting a menu item of the single-page web page and passes the user interaction to the browser for execution by the website 119. In another embodiment, the client device 102 executes 340 an action associated with the user interaction in the browser. The action executed by the client device 102 includes displaying the selected menu item (e.g., updating an element of the web page). The client device 102 determines 345 a variation of the single-page web page to display (e.g., including a variation of an element to display) to the user based on the experiment variant instructions and the user interactions. Responsive to the client device 102 displaying the determined variation of the single-page web page, the client device 102 using the client-side experimentation agent may monitor for changes to the state of the single page web application 119 and transmit 350 data associated with user interactions with the single-page web page to the experiment system 105. The experiment system 105 processes and aggregates 355 the received data.

FIG. 4 is a first flow diagram of a method 400 of an A/B testing sample ratio mismatch solver, according to one embodiment. Method 400 may be performed by processing logic that may comprise hardware (e.g., circuitry, dedicated logic, programmable logic, a processor, a processing device, a central processing unit (CPU), a system-on-chip (SoC), etc.), software (e.g., instructions running/executing on a processing device), firmware (e.g., microcode), or a combination thereof. In some embodiments, the method 400 may be performed by the components of system 100 of FIG. 1. Some or all of the steps may be performed by other entities in other embodiments. In addition, other embodiments may include different and/or additional steps, and the steps may be performed in different orders.

In one embodiment, the steps of FIG. 4 may be performed by processing logic of experiment system 105 of FIG. 1. For example, in one embodiment, processing logic at block 402 may configure an A/B test to comprise a first plurality of users in a control group and a second plurality of users in a test group. In one embodiment, the first plurality of users and the second plurality of users are to be provided two different versions of a webpage.

Processing logic at block 404 may, while the A/B test is executing, determine (e.g., by a processing device) that a sample ratio mismatch corresponding to the second plurality of users has occurred. In one embodiment, the sample ratio mismatch may be a result of an incorrect preprocessing of data associated with the A/B test. In another embodiment, the sample ratio mismatch is a result of the first plurality of users or the second plurality of users being virtual users.

To detect the sample ratio mismatch, processing logic may employ a variety of techniques. For example, in one embodiment, processing logic may detect a statistically significant departure from a ratio corresponding to the first plurality of users and the second plurality of users, wherein a probability that the sample ratio mismatch has occurred is greater than a predetermined error threshold.

Regarding the time of the detection, in one embodiment, the sample ratio mismatch is determined before the A/B test ends executing (e.g., wherein the determining occurs before a first one hundred users, or any other number of users, are provided the A/B test). In one embodiment, the sample ratio mismatch may be analyzed after each new data point is received. In another embodiment, the possibility of a sample ratio mismatch may be determined based on preselected intervals (e.g., time-based, data-based, etc.).

In one embodiment, processing logic at block 406 may, in response to the determining, end the execution of the A/B test before a previously scheduled end of the A/B test (e.g., when a sample ratio mismatch is determined before the end of the A/B testing period). Processing logic may further send an error notification identifying the sample ratio mismatch.

Figure 5:
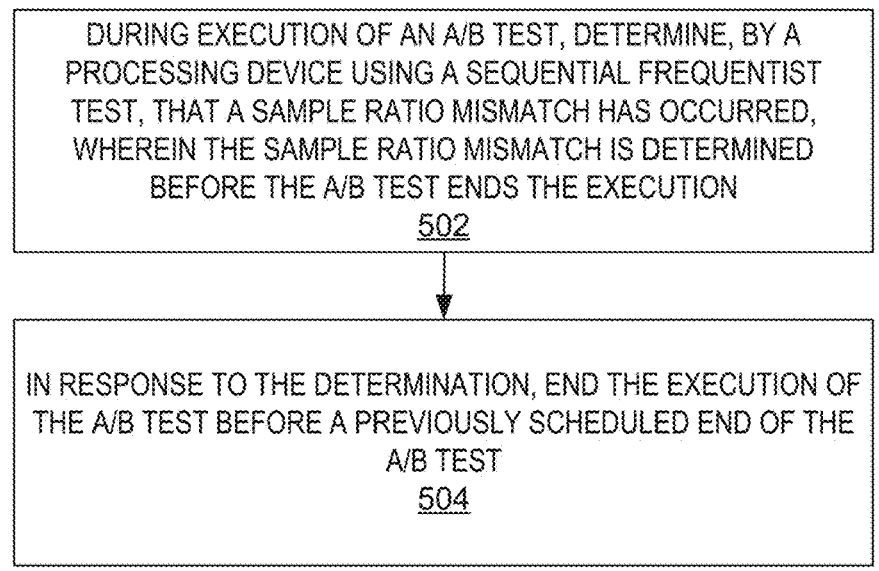
FIG. 5 is a second flow diagram of a method of an A/B testing sample ratio mismatch solver, according to one embodiment.

FIG. 5 is a second flow diagram of a method 500 of an A/B testing sample ratio mismatch solver, according to one embodiment. Method 500 may be performed by processing logic that may comprise hardware (e.g., circuitry, dedicated logic, programmable logic, a processor, a processing device, a central processing unit (CPU), a system-on-chip (SoC), etc.), software (e.g., instructions running/executing on a processing device), firmware (e.g., microcode), or a combination thereof. In some embodiments, the method 500 may be performed by the components of system 100 of FIG. 1. Some or all of the steps may be performed by other entities in other embodiments. In addition, other embodiments may include different and/or additional steps, and the steps may be performed in different orders.

In general, FIG. 5 may describe a sequential Bayesian multinomial test for use with the systems and methods described herein. In one embodiment, sequentially recorded observations may differ from the null hypothesis, which will be denoted $M_0$, if there is an unintended bias in the assignment mechanism or if an unknown missing data mechanism, as discussed herein. We therefore wish to test the null hypothesis $\theta=\theta_0$ vs. $\theta=\Delta^d\backslash\theta_0$. To develop a Bayesian hypothesis test, it is desirable to specify an alternative model for the data, denoted $M_1$. Consider the following model.

$$x_i|\theta, M_1 \sim \text{Multinomial}(1,\theta), \text{independently for } i=1,2,\ldots \quad \theta|M_1 \sim \text{Dirichlet}(\alpha_0). \tag{2}$$

In one embodiment, prior mass is concentrated around $\theta_0$ by specifying $\alpha_{0,i}=k\theta_{0,i}$ for concentration parameter $k \in \mathbb{R}^+$, in line with a "Jeffreys-type" testing procedure—if the null were not at least somewhat plausible, then a statistical test would not be needed. The Bayes factor comparing models $M_1$ to $M_0$ is analytically tractable and is given by $$BF_{10}(x_{1:t}) = \frac{p(x_{1:t}|M_1)}{p(x_{1:t}|M_0)} = \frac{\Gamma\left(\sum_{j=1}^d \alpha_{0,j}\right) \prod_{j=1}^d \Gamma\left(\alpha_{0,j}+\sum_{i=1}^t x_{i,j}\right)}{\Gamma\left(\sum_{j=1}^d \alpha_{0,j}+\sum_{i=1}^t x_{i,j}\right) \prod_{j=1}^d \Gamma(\alpha_{0,j})} \cdot \frac{1}{\prod_{j=1}^d \theta_{0,j}^{\sum_{i=1}^t x_{i,j}}}. \tag{3}$$

which, when combined with the prior odds, yields the posterior odds of model $M_1$ to $M_0$. It is helpful to consider the posterior odds as computed sequentially through the following recursive definition, $$O_t(\theta_0) = \frac{\Gamma\left(\sum_i \alpha_{t-1,i}\right) \prod_i \Gamma(\alpha_{t-1,i}+x_{t,i})}{\Gamma\left(\sum_i \alpha_{t-1,i}+x_{t,i}\right) \prod_i \Gamma(\alpha_{t-1,i})} \cdot \frac{1}{\prod_i \theta_{0,i}^{x_{t,i}}} O_{t-1}(\theta_0), \tag{4}$$

where $\alpha_t=\alpha_{t-1}+x_t$ and $O_0(\theta_0)=p(M_1)/p(M_0)$ (see appendix section A). In the rest of this disclosure, it may be assumed that the prior odds are unity, and so the posterior odds are interchangeable with the Bayes factor. Recursive definitions may require an initial value and for that reason we choose to work with the posterior odds. The dependence of $O_t(\theta_0)$ on the observed data $x_{1:t}$ is implicit in this notation, yet the null value $\theta_0$ being tested is made explicit to aid the discussion of confidence sequences in Theorem 3.2. If $\alpha_0$ is integer valued, and noting that all but one of the $x_{t,j}$ is 1 with the others 0, then the recursive definition simplifies substantially to $$O_t(\theta_0) = \prod_{j=1}^{d}\left(\frac{\alpha_{t-1,j}}{\sum_i \alpha_{t-1,i}} \frac{1}{\theta_{0,j}}\right)^{x_{t,j}} O_{t-1}(\theta_0), \quad (5)$$

$$= \prod_{j=1}^{d}\left(\frac{E[\theta_j \mid x_{1:t-1}]}{\theta_{0,j}}\right)^{x_{t,j}} O_{t-1}(\theta_0), \quad (6)$$

where the last line follows from the mean of the Dirichlet posterior predictive distribution. This multiplicative update has some intuitive appeal—it is the expected probability, based on the current Bayesian belief, divided by the null probability of the event that occurred. A pure Bayesian analysis could proceed by rejecting the null when $O_t(\theta_0) > c$ and reporting a posterior error probability of less than $1/(1+c)$. Many find the pure Bayesian approach unsettling, unable to formulate a prior belief on $\theta$ under the alternative model. We instead develop a test based on $O_t(\theta_0)$ which controls the frequentist Type-I error under optional stopping and continuation, regardless of the choice of $\alpha_0$.

Theoretical Results

A time-uniform bound, such as the one presented below in Theorem 3.1, controls the deviations of a stochastic process for all t simultaneously. Time-uniform bounds under the null hypothesis are essential for proving correctness of tests with optional stopping and optional continuation.

Theorem 3.1. Let $x_t \sim \text{Multinomial}(1, \theta$ for all $t \in \mathbb{N}$. Consider the sequence of posterior odds $O_t(\theta_0)$ defined as in equation (4) with $O_0(\theta_0) = 1$, then $$\mathbb{P}_{\theta=\theta_0}(\exists t \in \mathbb{N} : O_t(\theta_0) \geq 1/u) \leq u, \quad (7)$$

for all $u \in [0, 1]$ and for all choices of $\alpha_0$.

The uniform condition in equation 7 suggests to reject the null at time $\tau = \inf\{t \in \mathbb{N} : O_t(\theta_0) \geq 1/u\}$. Simply stated, a practitioner who rejects the null hypothesis as soon as the posterior odds become larger than $1/u$ incurs a frequentist type-I error probability of at most $u$. The proof, based on Martingale maximal inequalities, can be found in appendix section B. Furthermore, the posterior odds are equal to the Bayes factor under prior odds of unity, and so Theorem 3.1 can also be established as a corollary of mixture sequential probability ratio test (mSPRT). The test statistic in the mSPRT is formed by integrating the alternative likelihood divided by the null likelihood with respect to a weight function over the unknown parameter, and the hypothesis is rejected as soon as this test statistic exceeds $1/u$ in order to obtain a Type-I error of at most $u$. When the weight function is equal to the prior distribution, the mSPRT test statistic is simply the Bayes factor, and results of this form can be established for other Bayesian simple null vs. composite alternative hypothesis tests. In one embodiment, one can define a conservative sequential p-value process by $p_t = \min(p_{t-1}, 1/O_t(\theta_0))$, $p_0 = 1$, which satisfies the following sequential analogue of a conservative p-value $$\mathbb{P}_{\theta=\theta_0}(\exists t \in \mathbb{N} : p_t \leq u) \leq u. \quad (8)$$

The following Theorem exploits the duality between p-values and confidence intervals to derive sequential confidence sequences.

Theorem 3.2. (Confidence Sequences)
Under the assumptions of Theorem 3.1 let $I_t(u) = \{\theta \in S^d : O_t(\theta) < 1/u\}$, then $$\mathbb{P}_\theta\left(\theta \in \bigcap_{t=1}^{\infty} I_t(u)\right) \geq 1 - u \quad (9)$$

for all $u \in [0, 1]$ and for all choices of $\alpha_0$. Each $I_t(u)$ is a convex subset of $S^d$. Confidence sequences on individual components of $\theta$ can be found by projecting $I_t$ onto individual components, which is equivalent to solving the optimization problem Maximize/Minimize $\theta_i$ subject to $ku < \prod_{j=1}^{d} \theta_{0,j}^{\sum_{i=1}^{t} x_{i,j}}$ and $\sum_{i=1}^{d} \theta_i = 1$, where $k = \dfrac{\Gamma\left(\sum_{j=1}^{d}\alpha_j\right)}{\Gamma\left(\sum_{j=1}^{d}\alpha_j + \sum_{i=1}^{t} x_{i,j}\right)} \dfrac{\prod_{j=1}^{d}\Gamma\left(\alpha_j + \sum_{i=1}^{t} x_{i,j}\right)}{\prod_{j=1}^{d}\Gamma(\alpha_j)}$.

The objective is linear, while the constraints defining the feasible set $I_t(u)$ are convex and linear respectively, resulting in a convex optimization problem. Let $j_{ut,i}(u)$ and $j_{lt,i}(u)$ be the solution to the maximization and minimization of $\theta_i$ over $I_t(u)$ and let $J_{t,i}(u) = [j^l_{t,i}(u), j^u_{t,i}(u)]$, then $$\mathbb{P}_\theta\left(\theta_i \in \bigcap_{t=1}^{\infty} J_{t,i}(u), \text{ for } i = 1, 2, \ldots, d\right) \geq 1 - u. \quad (10)$$

These provide intervals which possess a nominal frequentist coverage probability for all time t over all components simultaneously.

Control over Type-I error probabilities would be of little value if the test were to have little ability to reject the null when $\theta = /\theta_0$. To prove that this test is not trivial, we prove that the test rejects the null when $\theta = /\theta_0$ almost surely, or that the test is asymptotically power one. We first establish the following result for the consistency of the posterior odds.

Theorem 3.3. (Asymptotic Properties of Posterior Odds)
Let $x_i$, be a sequence of Multinomial$(n_i, \theta^*)$ random variables with $\theta^* = /\theta_0$ and consider the sequence of posterior odds $O_t(\theta_0)$ defined as in equation (4) with $O_0(\theta_0) = 1$, then $$\frac{1}{t} \log O_t(\theta_0) \to D_{KL}(p(\cdot \mid \theta_*) \| p(\cdot \mid \theta_0)) \quad a.s. \quad (11)$$

as $t \to \infty$, for all choices of $\alpha_0$, where $D_{KL}(p(\cdot|\theta^*)\|p(\cdot|\theta_0))$ is the Kullback Leibler divergence of a multinomial distribution index by parameter $\theta_0$ from a multinomial distribution indexed by parameter $\theta^*$.

When $\theta^*\ne\theta_0$, we must have $D_{KL}(p(\cdot|\theta^*)\|p(\cdot|\theta_0))>0$, and so Theorem 3.3 can be restated as $O_t(\theta_0)\to\infty$ almost surely as $t\to\infty$, which consequently rejects the null almost surely for any choice of Type-I error probability u. The formal proof is given in appendix section C. Conceptually, the proof proceeds by expressing the Bayes factor comparing $M_1$ to $M_0$ in terms of two separate Bayes factors. The first compares $M^*$ to $M_1$, and the second compares $M^*$ to $M_0$ as follows $$\frac{1}{t}\log BF_{10}(x_{1:t}) = \frac{1}{t}\sum_{i=1}^{t}\log\left(\frac{p(x_i|M_*)}{p(x_i|x_{1:i-1},M_1)}\right) + \frac{1}{t}\sum_{i=1}^{t}\log\left(\frac{p(x_i|M_*)}{p(x_i|M_0)}\right),$$

where $p(x_i|M^*)$ is the density of a Multinomial($n_i$, $\theta^*$) distribution. When the $x_i$ are independently distributed according to Multinomial($n_i$, $\theta^*$), i.e. under model $M^*$, then the second term converges to the Kullback-Leibler divergence between models $M^*$ and $M_0$ by the strong law of large numbers. To address the first term, note that as t becomes large the Dirichlet posterior $p(\theta|x_1:t, M_1)$ concentrates mass on $\theta^*$, consequently bringing the posterior predictive $p(x_t+1|x_1:t, M_1)=p(x_t+1|\theta, M_1)$, $p(\theta|x_1:t, M_1)d\theta$ closer to the "true" density $p(x_t+1|M^*)$. For t large the logarithm of the fraction of densities becomes zero, and these zero terms then overwhelm the earlier non-zero terms in the sum.

One purpose of this disclosure was to provide for a tool that can be used sequentially to detect practical implementation errors in an experiment, such as identifying biased assignment mechanisms or surfacing missing data mechanisms which are frequently observed in online controlled experiments. The disclosed test permits optional stopping and continuation, allowing experiments to be continuously monitored.

The hypothesis can be tested, advantageously, after every single data point so as to detect errors as quickly as possible. While Bayesian in construction, we provided sequential guarantees of the frequentist Type-I error probability and also studied the power of this test through a combination of theoretical results and simulation studies. While our application of detecting errors in simply randomized experiments focused on a specific Multinomial-Dirichlet test, the same mathematical techniques can be used to generalize these results to other Bayesian tests. With generalization in mind, there are some remaining comments and concepts contemplated herein.

We first address the differences in the purely Bayesian approach and the test proposed here. For instance, under the same stopping rule of rejecting the null when the posterior odds exceed $1/u$, a Bayesian would report a (Bayesian) Type-I error probability of $u/(1+u)$, whereas a frequentist would report a slightly larger (frequentist) Type-1 error probability of u. One distinction is that the latter does not depend at all on the realized data, whereas the former depends on the data actually observed. In this sense, the Bayesian answer is a data dependent error probability. The intuition that one is less likely to believe an outcome is a false positive as the test statistic becomes more extreme leads to the notion of conditional frequentist testing.

In conditional frequentist testing, one reports the data dependent Type-I error probability $\alpha(s)=P(\text{Type I error}|S(X)=s)$ for a suitable conditioning statistic $S(X)$. One challenge in conditional frequentist testing is to find an appropriate conditioning statistic $S(X)$. It may be shown that Bayesian Type I error probabilities are equal to the conditional frequentist Type I error probabilities by choosing the conditioning statistic to be a function of the Bayes factor.

We note that the confidence sequences described in Theorem 3.2 share a connection with other Bayesian intervals. To see this, it is desirable to express the Bayes factor in terms of the Savage-Dickey density ratio as $$B(x_{1:t}|\theta_0) = \frac{p(\theta_0|M_1)}{p(\theta_0|x_{1:t}, M_1)}. \quad (13)$$

This, with $O_0(\theta_0)=1$, implies that $I_t(u)=\{\theta\in S^d:O_t(\theta)\le 1/u\}=\{\theta\in S^d:p(\theta|M_1)\le p(\theta|x1:t, M_1)/u\}$, which may be identified as a Bayesian support interval. This is proposed as an alternative to the more commonly reported Bayesian credible intervals, positing that the support interval is based on evidence in the data (how the data changes belief), whereas credible intervals are based on posterior belief directly. These intervals have some intuitive appeal as they are the parameter values for which their posterior density has increased beyond some factor of their prior density after observing the data. The present disclosure is the first to identify the sequential frequentist coverage probabilities, in the sense of Theorem 3.2, of these support intervals.

Turning now to FIG. 5, the steps may be performed by processing logic of experiment system 105 of FIG. 1. For example, in one embodiment, processing logic at block 502, during execution of an A/B test, determines (e.g., by a processing device using a sequential frequentist test) that a sample ratio mismatch has occurred. In one embodiment, the sequential frequentist test comprises one or more Bayesian multinomial-Dirichlet families. In another embodiment, determining the sample ratio mismatch may include establishing a Martingale property of one or more posterior odds under a null hypothesis to control a frequentist Type-I error.

In one embodiment, the sample ratio mismatch is determined before the A/B test ends the execution. At block 504, processing logic, in response to the determination, ends the execution of the A/B test before a previously scheduled end of the A/B test. In one embodiment, processing logic may stop the A/B test or continue the A/B test via maximal inequalities based on the determining (but in either case may stop of the A/B test before the previously-scheduled end of the A/B test).

In one embodiment, processing logic may repeat the determining step after each observation (e.g., after each new data point is analyzed/received) in the A/B test. Advantageously, the repeating may be performed without inflating a frequentist Type-I error associated with the A/B test. Optionally, processing logic may further invert the sequential test to determine confidence sequences that possess nominal frequentist coverage probabilities.

Figure 6:
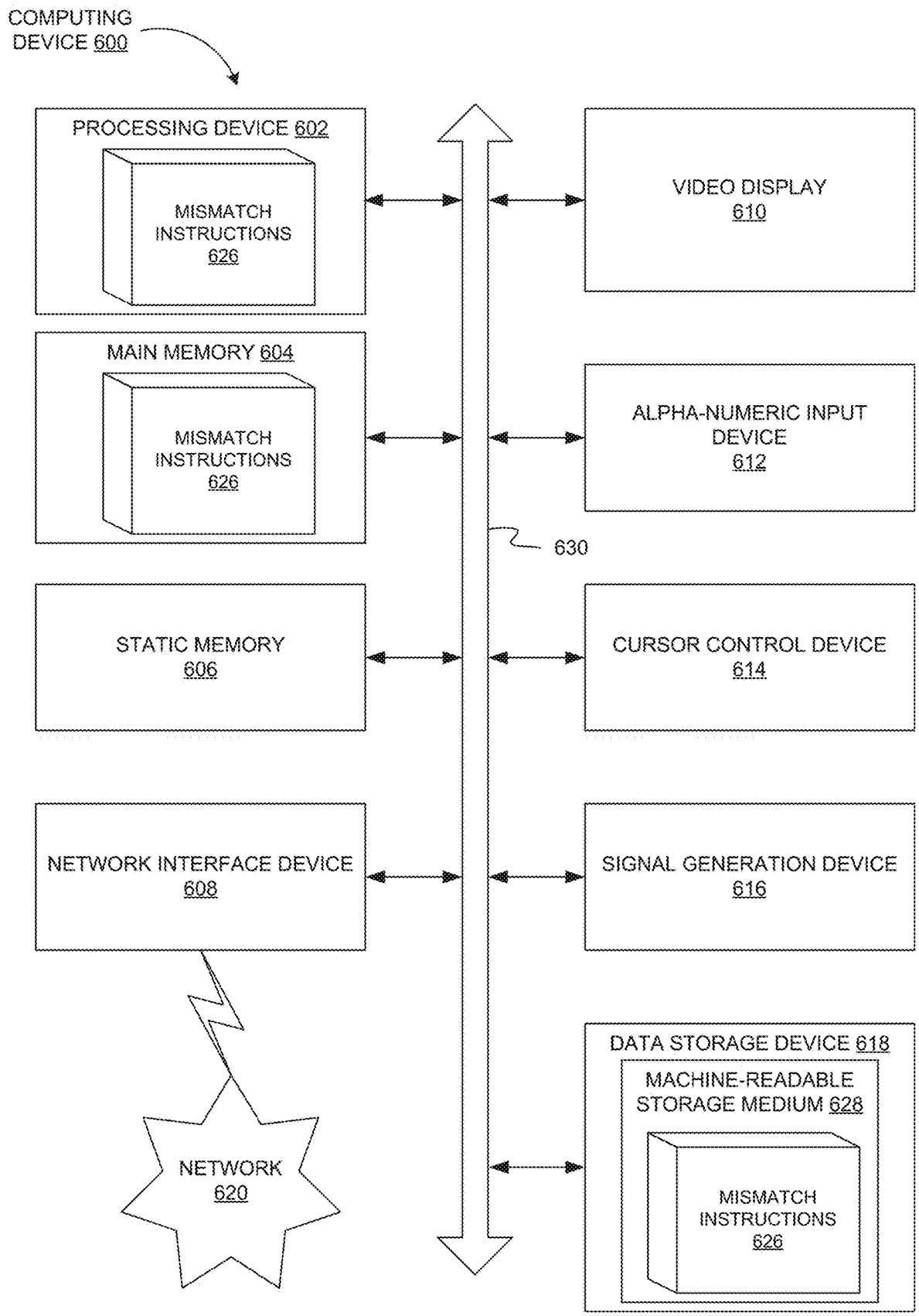
FIG. 6 is a block diagram of a computing device, in accordance with some embodiments of the present disclosure.

FIG. 6 is a block diagram of an example computing device 600 that may perform one or more of the operations described herein, in accordance with some embodiments. In various embodiments, computing device 600 may represent computing devices (e.g., servers) of the experimentation platform, third-party content provider client devices, and/or third-party content provider servers. Computing device 600 may be connected to other computing devices in a LAN, an intranet, an extranet, and/or the Internet. The computing device may operate in the capacity of a server machine in client-server network environment or in the capacity of a client in a peer-to-peer network environment. The computing device may be provided by a personal computer (PC), a set-top box (STB), a server, a network router, switch or bridge, or any machine capable of executing a set of instructions (sequential or otherwise) that specify actions to be taken by that machine. Further, while only a single computing device is illustrated, the term "computing device" shall also be taken to include any collection of computing devices that individually or jointly execute a set (or multiple sets) of instructions to perform the methods discussed herein.

The example computing device 600 may include a processing device (e.g., a general purpose processor, a PLD, etc.) 602, a main memory 604 (e.g., synchronous dynamic random access memory (DRAM), read-only memory (ROM)), a static memory 606 (e.g., flash memory and a data storage device 618), which may communicate with each other via a bus 630.

Processing device 602 may be provided by one or more general-purpose processing devices such as a microprocessor, central processing unit, or the like. In an illustrative example, processing device 602 may comprise a complex instruction set computing (CISC) microprocessor, reduced instruction set computing (RISC) microprocessor, very long instruction word (VLIW) microprocessor, or a processor implementing other instruction sets or processors implementing a combination of instruction sets. Processing device 602 may also comprise one or more special-purpose processing devices such as an application specific integrated circuit (ASIC), a field programmable gate array (FPGA), a digital signal processor (DSP), network processor, or the like. The processing device 602 may be configured to execute the operations described herein, in accordance with one or more aspects of the present disclosure, for performing the operations and steps discussed herein.

Computing device 600 may further include a network interface device 608 which may communicate with a network 620. The computing device 600 also may include a video display unit 610 (e.g., a liquid crystal display (LCD) or a cathode ray tube (CRT)), an alphanumeric input device 612 (e.g., a keyboard), a cursor control device 614 (e.g., a mouse) and an acoustic signal generation device 616 (e.g., a speaker). In one embodiment, video display unit 610, alphanumeric input device 612, and cursor control device 614 may be combined into a single component or device (e.g., an LCD touch screen).

Data storage device 618 may include a computer-readable storage medium 628 on which may be stored one or more sets of mismatch instructions 626, e.g., instructions for carrying out the operations described herein, in accordance with one or more aspects of the present disclosure. Mismatch instructions 626 may also reside, completely or at least partially, within main memory 604 and/or within processing device 602 during execution thereof by computing device 600, main memory 604 and processing device 602 also constituting computer-readable media. The instructions 626 may further be transmitted or received over a network 620 via network interface device 608.

While computer-readable storage medium 628 is shown in an illustrative example to be a single medium, the term "computer-readable storage medium" should be taken to include a single medium or multiple media (e.g., a centralized or distributed database and/or associated caches and servers) that store the one or more sets of instructions. The term "computer-readable storage medium" shall also be taken to include any medium that is capable of storing, encoding or carrying a set of instructions for execution by the machine and that cause the machine to perform the methods described herein. The term "computer-readable storage medium" shall accordingly be taken to include, but not be limited to, solid-state memories, optical media and magnetic media.

The methods and illustrative examples described herein are not inherently related to any particular computer or other apparatus. Various general purpose systems may be used in accordance with the teachings described herein, or it may prove convenient to construct more specialized apparatus to perform the required method steps. The required structure for a variety of these systems will appear as set forth in the description above.

The above description is intended to be illustrative, and not restrictive. Although the present disclosure has been described with references to specific illustrative examples, it will be recognized that the present disclosure is not limited to the examples described. The scope of the disclosure should be determined with reference to the following claims, along with the full scope of equivalents to which the claims are entitled.

As used herein, the singular forms "a", "an" and "the" are intended to include the plural forms as well, unless the context clearly indicates otherwise. It will be further understood that the terms "comprises", "comprising", "includes", and/or "including", when used herein, specify the presence of stated features, integers, steps, operations, elements, and/or components, but do not preclude the presence or addition of one or more other features, integers, steps, operations, elements, components, and/or groups thereof. Therefore, the terminology used herein is for the purpose of describing particular embodiments only and is not intended to be limiting.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Although the method operations were described in a specific order, it should be understood that other operations may be performed in between described operations, described operations may be adjusted so that they occur at slightly different times or the described operations may be distributed in a system which allows the occurrence of the processing operations at various intervals associated with the processing.

Various units, circuits, or other components may be described or claimed as "configured to" or "configurable to" perform a task or tasks. In such contexts, the phrase "configured to" or "configurable to" is used to connote structure by indicating that the units/circuits/components include structure (e.g., circuitry) that performs the task or tasks during operation. As such, the unit/circuit/component can be said to be configured to perform the task, or configurable to perform the task, even when the specified unit/circuit/component is not currently operational (e.g., is not on). The units/circuits/components used with the "configured to" or "configurable to" language include hardware—for example, circuits, memory storing program instructions executable to implement the operation, etc. Reciting that a unit/circuit/component is "configured to" perform one or more tasks, or is "configurable to" perform one or more tasks, is expressly intended not to invoke 35 U.S.C. 112, sixth paragraph, for that unit/circuit/component. Additionally, "configured to" or "configurable to" can include generic structure (e.g., generic circuitry) that is manipulated by software and/or firmware (e.g., an FPGA or a general-purpose processor executing software) to operate in manner that is capable of performing the task(s) at issue. "Configured to" may also include adapting a manufacturing process (e.g., a semiconductor fabrication facility) to fabricate devices (e.g., integrated circuits) that are adapted to implement or perform one or more tasks. "Configurable to" is expressly intended not to apply to blank media, an unprogrammed processor or unprogrammed generic computer, or an unprogrammed programmable logic device, programmable gate array, or other unprogrammed device, unless accompanied by programmed media that confers the ability to the unprogrammed device to be configured to perform the disclosed function(s).

The foregoing description, for the purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the embodiments and its practical applications, to thereby enable others skilled in the art to best utilize the embodiments and various modifications as may be suited to the particular use contemplated. Accordingly, the present embodiments are to be considered as illustrative and not restrictive, and the invention is not to be limited to the details given herein, but may be modified within the scope and equivalents of the appended claims.

What is claimed is:

1. A method of executing an A/B test, the method comprising:
    during execution of the A/B test, determining, by a processing device using a sequential frequentist test, that a sample ratio mismatch has occurred, wherein the sample ratio mismatch is determined before the A/B test ends the execution;
    in response to the determining, ending the execution of the A/B test before a previously scheduled end of the A/B test; and
    inverting the sequential frequentist test to determine confidence sequences that possess nominal frequentist coverage probabilities.

2. The method of claim 1, wherein the sequential frequentist test comprises one or more Bayesian multinomial-Dirichlet families.

3. The method of claim 1, wherein determining the sample ratio mismatch comprises establishing a Martingale property of one or more posterior odds under a null hypothesis to control a frequentist Type-I error.

4. The method of claim 3, further comprising at least one of: stopping the A/B test or continuing the A/B test via maximal inequalities based on the determining.

5. The method of claim 1, further comprising repeating the determining after each observation in the A/B test.

6. The method of claim 5, wherein the repeating is performed without inflating a frequentist Type-I error associated with the A/B test.

7. A system comprising:
    a memory to store data of an A/B test; and
    a processing device, operatively coupled to the memory, to:
        during execution of the A/B test, determine, using a sequential frequentist test, that a sample ratio mismatch has occurred, wherein the sample ratio mismatch is determined before the A/B test ends the execution;
        in response to the determination, end the execution of the A/B test before a previously scheduled end of the A/B test; and
        invert the sequential frequentist test to determine confidence sequences that possess nominal frequentist coverage probabilities.

8. The system of claim 7, wherein the sequential frequentist test comprises one or more Bayesian multinomial-Dirichlet families.

9. The system of claim 7, wherein, to determine the sample ratio mismatch, the processing device is to establish a Martingale property of one or more posterior odds under a null hypothesis to control a frequentist Type-I error.

10. The system of claim 9, wherein the processing device is to further perform at least one of: stopping the A/B test or continuing the A/B test via maximal inequalities based on the determining.

11. The system of claim 7, wherein the processing device is further to repeat the determining after each observation in the A/B test.

12. The system of claim 11, wherein the processing device is to repeat the determining without inflating a frequentist Type-I error associated with the A/B test.

13. A non-transitory computer-readable storage medium including instructions that, when executed by a processing device, cause the processing device to:
    during execution of an A/B test, determine, by the processing device using a sequential frequentist test, that a sample ratio mismatch has occurred, wherein the sample ratio mismatch is determined before the A/B test ends the execution;
    in response to the determination, end the execution of the A/B test before a previously scheduled end of the A/B test; and
    invert the sequential frequentist test to determine confidence sequences that possess nominal frequentist coverage probabilities.

14. The non-transitory computer-readable storage medium of claim 13, wherein the sequential frequentist test comprises one or more Bayesian multinomial-Dirichlet families.

15. The non-transitory computer-readable storage medium of claim 13, wherein, to determine the sample ratio mismatch, the processing device is to establish a Martingale property of one or more posterior odds under a null hypothesis to control a frequentist Type-I error.

16. The non-transitory computer-readable storage medium of claim 15, wherein the processing device is to further perform at least one of: stopping the A/B test or continuing the A/B test via maximal inequalities based on the determining.

17. The non-transitory computer-readable storage medium of claim 13, wherein the processing device is further to repeat the determining after each observation in the A/B test.

18. The non-transitory computer-readable storage medium of claim 17, wherein the processing device is to repeat the determining without inflating a frequentist Type-I error associated with the A/B test.

* * * * *